2,783,284
CHLORINATION OF BIS(CHLOROPHENYL) METHANE

W E Craig and Edward F. Riener, Philadelphia, Pa., and Harold F. Wilson, Moorestown, N. J., assignors to Rohm & Haas Company, Philadelphia, Pa., a corporation of Delaware No Drawing. Application October 5, 1953,
Serial No. 384,322

2 Claims. (Cl. 260—649)

This invention relates to a process for chlorinating bis(chlorophenyl)methane.

It has been reported that diphenylmethane is incapable of chlorination with the aid of a free radical initiator and is capable of inhibiting the chlorination of other hydrocarbons. Thus addition of diphenylmethane to toluene was found to prevent peroxide-catalyzed chlorination.

It was, therefore, an unexpected discovery that bis-(chlorophenyl)methane can be chlorinated in the aliphatic portion under the influence of a free radical initiator. Thus, when bis(chlorophenyl)methane is treated with an organic peroxide, or an aliphatic azo catalyst, or ultraviolet light and sulfuryl chloride or chlorine is added thereto, reaction with chlorine takes place at the methane carbon with replacement of one or both hydrogens to form the mono- and/or di- chlorides.

The reaction takes place between 0° and 75° C., preferably between 20° and about 60° C., desirably in the presence of an inert organic solvent, such as carbon tetrachloride, ethylene dichloride, or acetic acid. Chlorination in the absence of a solvent is slower. Reaction is continued until a desired chlorine uptake has occurred, up to substitution by two chlorine atoms.

The mixture of products obtained by partial chlorination is useful as a synergist for promoting the action of 1,1 - bis(chlorophenyl) - 2,2,2-trichloroethane against so-called DDT-resistant flies. Rather remarkably this mixture appears to be quite as active or potent as pure bis-chlorophenyl)chloromethane which is the theoretical intermediately formed chlorinated product and which is best made in a pure form by other methods. It should be remarked that the starting bis(chlorophenyl)methane and bis(chlorophenyl)dichloromethane, a product which can be formed and actually isolated, are not individually synergists with DDT.

When two atoms of chlorine have been introduced into bis(chlorophenyl)methane, the reaction mixture can be distilled to give bis(chlorophenyl)dichloromethane. This is useful as a chemical intermediate.

As a free radical initiator there may be used an organic peroxide, such as benzoyl peroxide, caproyl peroxide, lauroyl peroxide, tert-butyl hydroperoxide, tert-butyl perbenzoate, cumene hydroperoxide, methyl ethyl ketone peroxide, and the like; an acyclic azo catalyst, such as azodiisobutyronitrile, dimethyl azodiisobutyrate, diethyl azodiisobutyrate, azobis($\alpha,\gamma$-dimethylvaleronitrile), azobis($\alpha$-methylbutyronitrile), azodiisobutyramide, dimethyl azobismethylvalerate, and other acyclic azo compound having the —N=N— group attached to aliphatic carbon atoms at least one of which is tertiary; or ultraviolet light.

Examples of typical chlorinations of bis(chlorophenyl)methane are given in the following illustrative examples. Parts are by weight.

EXAMPLE 1

A solution was prepared from 48 parts of bis(p-chlorophenyl)methane and 750 parts of carbon tetrachloride. It was warmed to 35° C., irradiated with ultraviolet light, and treated with 21 parts of chlorine. There was an induction period of about five minutes, after which reaction set in with the temperature rising to 41° C. and hydrogen chloride being evolved. The reaction was complete in about six minutes. Solvent was driven off to leave an oil which, when cooled, gave 11 parts of a solid. The oil was distilled, a main fraction being collected at 189°–193° C./5 mm., amounting to 25.5 parts. It solidified upon standing and melted at 64°–65° C. It corresponded in composition to $\alpha$-chlorobis(p-chlorophenyl)methane. A mixed melting point with an authentic sample of this compound prepared by a different procedure showed no depression.

EXAMPLE 2

A solution was prepared from 32 parts of bis(p-chlorophenyl)methane and 750 parts of carbon tetrachloride. The solution was irradiated with ultraviolet light while chlorine was passed in, the temperature rising from 30° to 63° C. After reaction had subsided, the solvent was evaporated and the residual oil was distilled at 196°–204° C./8–10 mm. to yield 32 parts of product which solidified on standing and which corresponded in composition fairly closely to $\alpha$-dichlorobis(p-chlorophenyl)-methane. It had a chlorine content of 45.8% (theory 46.3%).

EXAMPLE 3

A solution was prepared from 48 parts of bis(p-chlorophenyl)methane and 750 parts of carbon tetrachloride. It was treated with 0.2 part of dimethyl azodiisobutyrate. Chlorine was then run in and the temperature of the reaction mixture was held at 41° C. while 17 parts of chlorine were taken up. The solvent was driven off by heating to give an oil which partly solidified when cooled. Solid and oil were separated. The solid contained 7.6% of ionizable chlorine, indicating 58% chlorination to $\alpha$-chlorobis(chlorophenyl)methane.

EXAMPLE 4

A solution of 70 parts of bis(p-chlorophenyl)methane in 450 parts of carbon tetrachloride was treated with 83 parts of sulfuryl chloride. The solution was irradiated with ultraviolet light. After removal of solvent the residue was distilled. At 146°–148° C./0.5 mm. a fraction of 67 parts was obtained. It solidified when cool, melting at 55°–56° C. After recrystallization from diisobutylene the product melted at 57°–59° C. and corresponded in composition to $\alpha$-chlorobis(chlorophenyl)-methane.

EXAMPLE 5

A solution of 224 parts of bis(chlorophenyl)methane in 375 parts of carbon tetrachloride was irradiated with ultraviolet light while 56 parts of chlorine were added over a period of 28 minutes. The reaction temperature rose from 35° C. to a maximum of 48° C. Solvent was then driven off and the residue was fractionally distilled. The various fractions were analyzed for their content of $\alpha$-chlorobis(chlorophenyl)methane. Various fractions were used in DDT solutions and tested against DDT-resistant female flies. Application of 10 micrograms of DDT per female fly gave a kill of 6±4%. The data show that the chlorinated mixtures are as effective as synergists or activators for DDT as pure $\alpha$-chlorobis-(chlorophenyl)methane.

The data are summarized in the following table in which the various fractions are indicated by letter and identified by distillation range at 0.5–0.9 mm. The weights of the fractions are shown in the third column. The fourth column (percent compd.) gives the percentages of α-chlorobis(phenyl)methane (A) in the various fractions. There then follow the kills of DDT resistant flies as the dose of DDT is reduced from 10 to 1.25 micrograms per fly while the activator (A) is also reduced, but held at a constant ratio to the DDT.

*Kill of resistant flies*

| Fraction | Distilled at— (degrees) | Weight (parts) | Percent Compd. | Percent Killed at— | | | |
|---|---|---|---|---|---|---|---|
| | | | | DDT..10 A......2 | 5 1 | 2.5 .5 | 1.5 .25 |
| B | 129–135 | 26 | 17 | 100 | 100 | 95 | 72 |
| C | 135–137 | 49 | 28 | 100 | 85 | 72 | 25 |
| D | 137–144 | 61 | 41 | (¹) | | | |
| E | 146–156 | 56 | 93 | 100 | 95 | 85 | 48 |
| F | 158–160 | 3 | 99 | 100 | 85 | 98 | 60 |

¹ Not tested.

It was found that when less than two moles of chlorine were supplied per mole of bis(chlorophenyl)methane, mixtures of starting methane, α-chlorobis(chlorophenyl)methane, and α-dichlorobis(chlorophenyl)methane resulted. With excess chlorine the conversion to the α-dichloro compound became essentially complete. The mixed products, as has been shown, are useful as an activating additive for DDT.

We claim:
1. The process of preparing α-dichlorobis(p-chlorophenyl)methane which comprises reacting two moles of chlorine with a mole of bis(p-chlorophenyl)methane in an inert organic solvent between 0° and 75° C. under the influence of a free radical initiator.
2. The process of claim 1 in which the initiator is an organic peroxide.

References Cited in the file of this patent

UNITED STATES PATENTS

| 1,246,739 | Gibbs et al. | Nov. 13, 1917 |
| 2,324,248 | Vaughan et al. | July 13, 1943 |

OTHER REFERENCES

Norris et al.: "Ber der deut. Chem. Gesell.," vol. 43, page 2959 (1910).